(12) United States Patent
Patel et al.

(10) Patent No.: US 10,437,247 B2
(45) Date of Patent: Oct. 8, 2019

(54) MULTI-STAGE OPERATION OF AUTONOMOUS VEHICLES

(71) Applicant: UDELV INC., Burlingame, CA (US)

(72) Inventors: Akshat Patel, San Francisco, CA (US); Hugo Boyer, Burlingame, CA (US); Vineet Singh, Burlingame, CA (US)

(73) Assignee: UDELV INC., Burlingame, CA (US)

(*) Notice: Subject to any disclaimer, the term of this patent is extended or adjusted under 35 U.S.C. 154(b) by 127 days.

(21) Appl. No.: 15/673,601

(22) Filed: Aug. 10, 2017

(65) Prior Publication Data

US 2019/0049948 A1    Feb. 14, 2019

(51) Int. Cl.
G05D 1/02    (2006.01)
G05D 1/00    (2006.01)

(52) U.S. Cl.
CPC ......... G05D 1/0038 (2013.01); G05D 1/0027 (2013.01); G05D 1/0061 (2013.01); G05D 1/0214 (2013.01); G05D 1/0223 (2013.01); G05D 1/0276 (2013.01); G05D 2201/0213 (2013.01)

(58) Field of Classification Search
CPC .. G05D 1/0061; G05D 1/0038; G05D 1/0214; G05D 1/0223
See application file for complete search history.

(56) References Cited

U.S. PATENT DOCUMENTS 6,813,557 B2    11/2004 Schmidt et al.
7,739,040 B2    6/2010 Horvitz
7,778,773 B2    8/2010 Fajardo et al.
7,975,798 B2    7/2011 Lucas et al.
8,397,138 B2    3/2013 Gardner
(Continued)

FOREIGN PATENT DOCUMENTS

EP        1360618 A2    11/2003
KR    10-1456184 B1    11/2014
(Continued)

OTHER PUBLICATIONS

Udelv, Inc., "udelv Makes World's First Public Road Test Delivery From Its Autonomous Last-Mile Delivery Vehicle," PR Newswire from: https://www.prnewswire.com/news-releases/udelv-makes-worlds-first-public-road-test-delivery-from-its-autonomous-last-mile-delivery-vehicle-300590123.html, Jan. 30, 2018, 4 pp.
(Continued)

Primary Examiner — Todd M Melton
(74) Attorney, Agent, or Firm — Perkins Coie LLP

(57) ABSTRACT

Systems and methods for operating a vehicle by switching between an autonomous control system within the vehicle and a remote operator are described herein. For the handover between the autonomous control system and the remote operator, the system can process current maneuvering parameters of the vehicle to at least select a teleoperation control type. The system can also generate a concurrent feature profile including a set of automated features that are configured to be implemented during teleoperation of the vehicle. The system can implement the handover of vehicle control according to the teleoperation control type while the vehicle autonomously or semi-autonomously operates according to the concurrent feature profile.

20 Claims, 5 Drawing Sheets

(56) References Cited

U.S. PATENT DOCUMENTS

| | | | |
|---|---|---|---|
| 8,634,969 B2 | 1/2014 | Buelthoff et al. | |
| 8,706,394 B2 | 4/2014 | Lee et al. | |
| 9,258,390 B2 | 2/2016 | Riddoch et al. | |
| 9,275,549 B2 | 3/2016 | Ando | |
| 9,287,956 B2 | 3/2016 | Campos | |
| 9,300,430 B2 | 3/2016 | Matthew | |
| 9,428,183 B2 | 8/2016 | Foley et al. | |
| 9,494,439 B1 | 11/2016 | Ross et al. | |
| 9,507,346 B1 | 11/2016 | Levinson et al. | |
| 9,560,692 B2 * | 1/2017 | McGee | H04W 88/00 |
| 9,586,525 B2 | 3/2017 | Sejalon et al. | |
| 9,688,288 B1 * | 6/2017 | Lathrop | B60W 50/14 |
| 9,720,410 B2 * | 8/2017 | Fairfield | G05D 1/0044 |
| 9,720,411 B2 * | 8/2017 | Crombez | G05D 1/0088 |
| 9,964,948 B2 * | 5/2018 | Ullrich | G05D 1/0038 |
| 2008/0086269 A1 | 4/2008 | Joe et al. | |
| 2010/0121576 A1 | 5/2010 | Aso et al. | |
| 2013/0090802 A1 | 4/2013 | Curtis et al. | |
| 2014/0129135 A1 | 5/2014 | Holden et al. | |
| 2014/0303827 A1 | 10/2014 | Dolgov et al. | |
| 2014/0336935 A1 | 11/2014 | Zhu et al. | |
| 2015/0352953 A1 | 12/2015 | Koravadi | |
| 2015/0359032 A1 | 12/2015 | Menard et al. | |
| 2016/0273922 A1 | 9/2016 | Stefan | |
| 2017/0123419 A1 | 5/2017 | Levinson et al. | |
| 2017/0124512 A1 | 5/2017 | Harvey | |
| 2017/0308098 A1 | 10/2017 | Yu et al. | |
| 2017/0329330 A1 * | 11/2017 | Hatano | B62D 15/025 |
| 2018/0005169 A1 | 1/2018 | High et al. | |
| 2018/0074497 A1 * | 3/2018 | Tsuji | G06K 9/00288 |
| 2018/0299898 A1 * | 10/2018 | Luo | G05D 1/0223 |

FOREIGN PATENT DOCUMENTS

| | | |
|---|---|---|
| KR | 10-20170077495 | 7/2017 |
| WO | 200915178 A1 | 12/2009 |

OTHER PUBLICATIONS

International Search Report and Written Opinion issued in PCT/US2018/043645 and dated Nov. 14, 2018, 14 pages.

International Search Report and Written Opinion issued in PCT/US19/12266 and dated Apr. 29, 2019, 11 pages.

* cited by examiner

MULTI-STAGE OPERATION OF AUTONOMOUS VEHICLES

BACKGROUND

Technological advancements are increasingly enabling automation of vehicle operations (e.g., for airplanes, automobiles, ships, or drones). For example, autopilot systems have evolved to control an aircraft with respect to multiple axes, and provide automated controls for climb, cruise, descent, approach, and landing portions of a flight. Also for example, automobiles provide driver assistance features for dynamic driving tasks, such as lane-detection and emergency braking. Self-driving automobiles are also being developed and tested for deployment.

Various industries and organizations are responding to developments in vehicle automation by, for example, adopting or setting regulations, best-practices, standards, etc. For example, the National Highway Traffic Safety Administration (NHTSA, i.e., a United States government agency) and the Society of Automotive Engineers (SAE) have adopted definitions (i.e., as part of SAE standard J3016™) classifying automation levels for on-road motor vehicles. According to the definitions:

A SAE level 0 or "No Automation" system requires full-time performance by a human driver/operator;

a Level 1 or "Driver Assistance" system is a driver assistance system that provides driving mode-specific features associated with either steering or acceleration/deceleration (i.e., with the expectation that the human driver/operator performs all remaining aspects of the dynamic driving task);

a Level 2 or "Partial Automation" system is a driver assistance system that provides driving mode-specific execution associated with both steering and acceleration/deceleration;

a Level 3 or "Conditional Automation" system is an automated driving system that provides driving mode-specific performance of all aspects of the dynamic driving task with the expectation that the human driver will respond appropriately to a request to intervene;

a Level 4 or "High Automation" system is an automated driving system that provides driving mode-specific performance of all aspects of the dynamic driving task, even if a human driver does not respond appropriately to a request to intervene; and a Level 5 or "Full Automation" system is an automated driving system that provides full-time performance of all aspects of the dynamic driving task under all roadway and environmental conditions that can be managed by a human driver.

Except for "Full Automation" systems, autonomous vehicles require varying levels of human interaction for the dynamic driving task, such as from one or more passengers within the vehicle or from a remote operator through teleoperation. While the teleoperation process can provide various benefits (e.g., geographical stability for drivers of delivery vehicles), the process can introduce technological challenges (e.g., due to communication delays), especially during a handover between the automated driving system and the remote human operator. It would therefore be beneficial to monitor the environment of the vehicle and take precautionary measures during the handover process.

DETAILED DESCRIPTION

Figure 1:
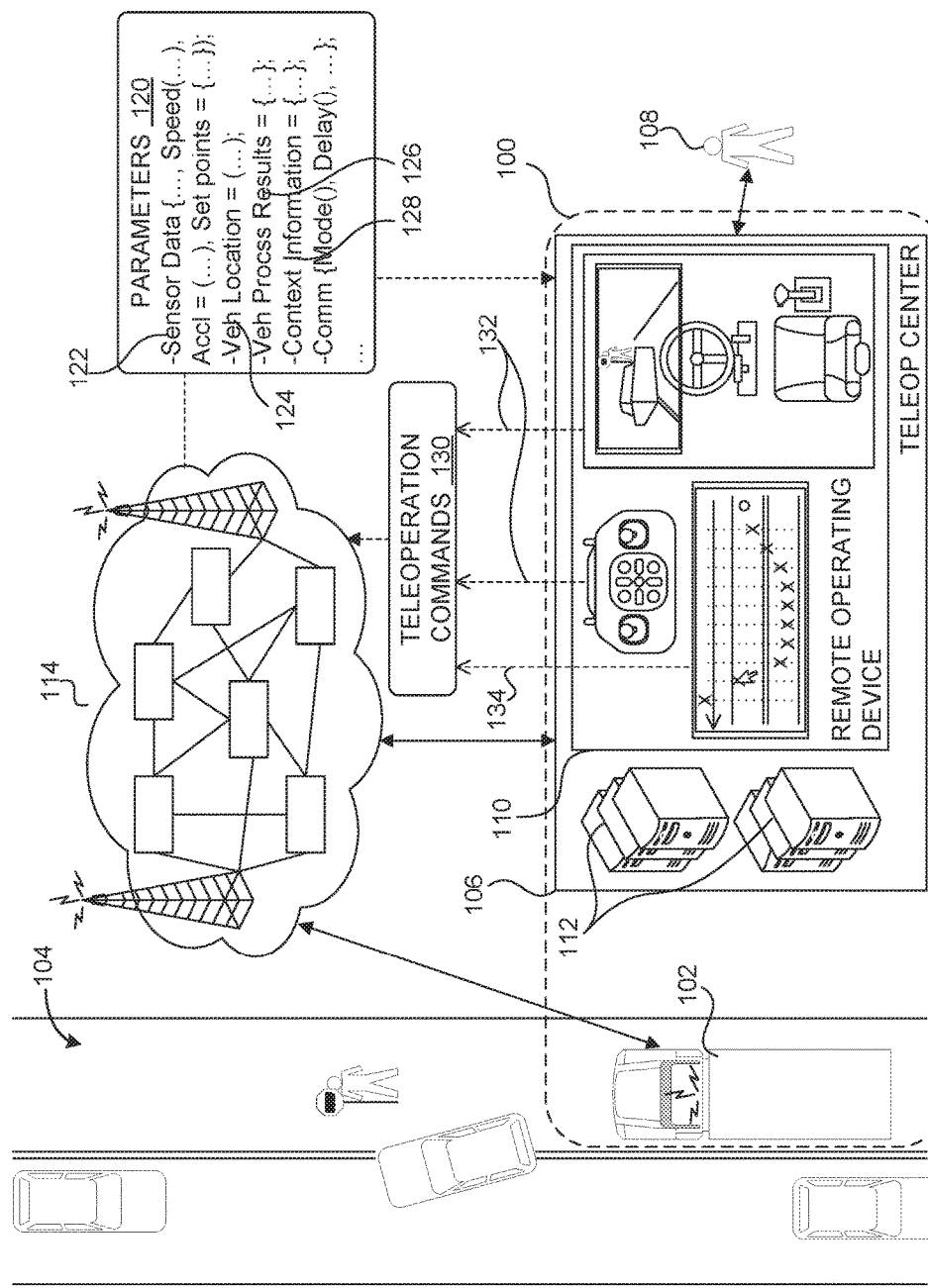
FIG. 1 is a diagram of an example environment in which a system for autonomous vehicle teleoperation may operate according to some embodiments.

A system and method to provide teleoperation of autonomous vehicles, such as automobiles, are disclosed herein. A vehicle operation system allows a human operator to control and/or maneuver an autonomous vehicle (e.g., a mobile structure including a propulsion system, such as an engine or a motor, that is capable of at least partial autonomous operation) from a remote location. The vehicle operation system can provide information regarding the autonomous vehicle and/or information regarding surroundings thereof for teleoperation. The vehicle operation system can further use the various information to initiate a handover for switching between autonomous operation by the vehicle and teleoperation by the remote operator.

The vehicle operation system can implement a multi-stage process in providing teleoperation, such as a process based on implementing one of the automation Levels 1-4 based on sensor information associated with the autonomous vehicle, the surroundings of the autonomous vehicle, or a combination thereof. In some embodiments, the vehicle operation system can initiate the handover for the teleoperation process based on a determination according to various different layers (e.g., issues corresponding to hardware or system level conditions, software or middleware level conditions, or intelligence level conditions, such as for decisions with a confidence level below a threshold or an oscillating decision).

In some embodiments, the handover can occur after pulling the vehicle over and bringing the vehicle to a stop, or while the vehicle is moving (e.g., at a speed lower than full autonomous operation speeds). Further, the vehicle can maintain a certain stage of driving or assistance features (e.g., a set of features corresponding to automation Levels 1-3) during the handover and/or during the teleoperation. The vehicle operation system can determine the vehicle maneuver preceding or in anticipation of the handover, the set of concurrently implemented driving or assistance features, or a combination thereof according to the vehicle, the vehicle's surroundings, a status or a condition associated with the remote operator, or a combination thereof.

In some embodiments, the handover, the teleoperation, the driving or assistance features, or a combination thereof can be implemented based on threshold distances. The vehicle operation system can calculate the threshold distances (e.g., in real-time) based on a vehicle speed, surrounding items, preceding positions or movements of surrounding items, a vehicle decision, or a combination thereof. For example, the vehicle operation system can utilize sensor information corresponding to an area beyond a first threshold to make handover-related decisions. The vehicle operation system can subsequently calculate a second threshold that is closer to the vehicle than the first threshold for implementing driver-assistance features (e.g., an emergency braking feature) while implementing the teleoperation features. The first threshold, the second threshold, or a combination thereof can be calculated in real-time based on the vehicle's speed, detected conditions, etc.

In some embodiments, the vehicle operation system can implement teleoperation of the vehicle through real-time interactions with the remote operator. The vehicle operation system can simulate or recreate the environment surrounding the vehicle for the remote operator using sensor information (e.g., such as from a radar, a LIDAR, an inertial motion unit (IMU), an encoder, an ultrasonic sensor, a proximity sensor, a camera, a lane sensor, or a self-reporting/detecting circuitry for errors and/or set points in components or subsystems, etc.) from the vehicle. The remote operator can analyze the environment using the communicated information, and can input driving commands or instructions (e.g., using a controller, a button, a wheel, a pedal, a computer interface, or a combination thereof). The vehicle operation system can communicate the commands or instructions to the vehicle and implement them at the vehicle.

In some embodiments, the vehicle operation system can implement teleoperation of the vehicle based on path control (e.g., using a path designated by the remote operator). The vehicle operation system can communicate information regarding the environment surrounding the vehicle, map information, etc. to the remote operation center or device, and ultimate to the remote operator. The remote operator can use the real-time information to designate a set of points or locations (e.g., such as overlaid on an image of the road in front of the vehicle, overlaid on the map, or a combination thereof). The autonomous vehicle can receive the set of points or locations and maneuver itself to traverse the designated locations.

Suitable Environments

FIG. 1 and the following discussion provide a brief, general description of a suitable environment in which a vehicle operation system may be implemented. Although not required, aspects of the invention are described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the invention can also be practiced in distributed computing environments, where tasks or modules are performed by remote processing devices linked through a communications network including, but not limited to, a Local Area Network (LAN), Wide Area Network (WAN), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, or stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer while corresponding portions reside on a client computer.

Referring to the example of FIG. 1, a vehicle operation system 100 in which aspects of the described technology may operate includes one or more self-driving or autonomous vehicle 102, such as a vehicle capable of operating (i.e., including maneuvering and/or traversing the vehicle through physical space and/or controlling functions, components, or subsystems of the vehicle) according to and through the surrounding environment 104 (e.g., automobiles with SAE Level 4 capabilities). The vehicle operation system 100 can further include one or more devices corresponding to a teleoperation center 106. The teleoperation center 106 can be a set of devices for a service provider that allows a remote operator 108 to control operations or movements of the autonomous vehicles 102 from a remote location. A handover process (e.g., a set of operations for exchanging vehicle control between the autonomous vehicle 102 and the remote operator 108) can be initiated based on a trigger or a condition associated with the surrounding environment 104 and/or the autonomous vehicle 102.

Based on the handover process, the remote operator 108 can utilize one or more devices (e.g., one or more remote operating devices 110, one or more servers 112, and/or other computing and/or control devices) to control operations of the autonomous vehicle 102. For example, the remote operator 108 can use the remote operating device 110 (e.g., a hand-held controller, or a driving simulator including indicators and screens for communicating the surrounding environment 104, along with a steering wheel, an accelerator, a decelerator, a brake, and/or other auxiliary controls) to control the autonomous vehicle 102 in real-time. The remote operator 108 can use the remote operating device 110 (e.g., a user interface, such as a screen and a pointer/mouse or a touch screen) to designate a travel path, a speed and/or acceleration profile, a maneuver, or a combination thereof. The designated information can be communicated to the autonomous vehicle 102 as a set of information, and the autonomous vehicle 102 can operate according to the designated information for the corresponding context and/or location(s). As a further example, the servers 112 and/or other computing devices can communicate information to and/or from the autonomous vehicle 102 (e.g., over a wireless communication network), interact with the remote operator 108, process the information from the remote operator 108 and/or the autonomous vehicle 102, or a combination thereof.

The autonomous vehicle 102 and the teleoperation center 106 (e.g., the servers 112 thereof) can communicate information over a network 114. The network 114 can include wired or wireless networks connecting various devices for communicating or exchanging data. For example, the network 114 can include local area networks (LAN), wide area networks (WAN), wireless fidelity (WiFi) network, cellular network (e.g., fourth generation (4G) Long Term Evolution (LTE), fifth generation (5G) communication network, or other networks), fiber optic networks, cellular network, satellite network, telephone network, the Internet, or a combination thereof.

The autonomous vehicle 102 and the teleoperation center 106 can communicate or exchange a variety of information. For example, the autonomous vehicle 102 and the teleoperation center 106 can communicate current maneuvering parameters 120 (e.g., from the autonomous vehicle 102 to the teleoperation center 106 or a device therein), a teleoperation commands 130 (e.g., from the teleoperation center 106 or a device therein to the autonomous vehicle 102), or a combination thereof.

The current maneuvering parameters 120 can include information associated with a status or state of the autonomous vehicle 102, information associated with the surrounding environment 104, information associated with the dynamic driving/navigating operation, a processing result thereof, or a combination thereof. The vehicle operation system 100 can process the current maneuvering parameters 120 (e.g., data 122 from sensors, such as cameras, proximity sensors, etc., vehicle location 124, vehicle processing results 126, or context information 128) for operating the autonomous vehicle 102.

For example, the automated driving system of the autonomous vehicle 102 can determine the vehicle location 124 (e.g., coordinates representing a geographic location of the autonomous vehicle) in real-time, such as using a dead-reckoning process signals from a Global Positioning System (GPS), a global navigation satellite system (GNSS) or equivalent systems. The automated driving system can further determine information regarding the vehicle itself and/or the surrounding environment by detecting the sensor data 122 to operate the autonomous vehicle 102. By way of example, the sensor data 122 can include radar or LIDAR output, lane-detector output, a proximity reading, a camera image, an acceleration reading, a speed reading, a state or status of a vehicle component or subsystem (e.g., a component error, failure, or status message, a battery voltage reading, or a server temperature reading), set points (e.g., information representing physical settings, a degree or amount of extension or rotation of the actuators, or a combination thereof), a communication delay or message travel time between the vehicle and the teleoperation center, etc. The automated driving system can further access the context information 128 (e.g., a map, a road condition report, a traffic flow/speed reading or estimation, an accident report, or a weather report) associated with the autonomous vehicle 102 and/or the surrounding environment 104. Using the sensor data 122, the vehicle location 124, the context information 128, or a combination thereof, the automated driving system can calculate or generate the vehicle processing results 126 to operate the autonomous vehicle 102 without dynamic human input. By way of example, the vehicle processing results 126 can include a recognition result, a vehicle-generated path, a calculated maneuver, a change in setting or status for the vehicle, or a combination thereof.

Also for example, the automated driving system can use the sensor data 122, the vehicle location 124, the context information 128, or a combination thereof to identify a trigger and initiate the handover to transfer the vehicle control from the automated driving system 100 to the remote operator 108. The automated driving system 100 can calculate or generate the vehicle processing results 126 corresponding to the trigger (e.g., the recognition result matching a predetermined scenario, an error or a failure report/status from one or more vehicle components or subsystems, an oscillation between different maneuvers, set points, and/or paths, or a combination thereof) to initiate the handover mechanism.

As illustrated in FIG. 1, the automated driving system can determine the vehicle processing results 126 that conflict with each other (e.g., recognizing a person in the middle of the travel lane, a preceding car crossing the center line in violation of the operating rules and contrary to a "STOP" sign detected near the road, etc.). The automated driving system can use the conflicting results (e.g., to follow the preceding car on one hand, and to follow the driving rules on the other) as the trigger for the handover. In some embodiments, the automated driving system can generate oscillating results (e.g., a number of changes in upcoming maneuver or path, such as between following the preceding car and coming to a stop for the illustrated scenario, within a duration that falls within a threshold time period), which can be used as the handover trigger.

Based on identifying the trigger, the autonomous vehicle 102 and one or more of the devices can implement a process to transfer control of the vehicle to the remote operator 108. After the handover, the teleoperation process can be implemented where the autonomous vehicle 102 operates in response to the remote operator 108.

During the teleoperation process, the autonomous vehicle 102 can continuously send the current maneuvering parameters 120 to the teleoperation center 106, which can communicate the current maneuvering parameters 120 (e.g., by simulating or recreating the surrounding environment 104 and/or reporting the vehicle information) to the remote operator 108. The remote operator 108 can control operations of the autonomous vehicle 102 according to the communicated information.

The remote operator 108 can use the remote operating device 110 to generate the teleoperation commands 130 that are used to operate the autonomous vehicle 102. For example, the remote operating device 110 (e.g., hand-held controllers or simulation devices) can generate real-time control commands 132 (e.g., information indicating a position or a change therein for the steering wheel, the accelerator, the brake, the auxiliary control, a corresponding control input interface, or a combination thereof) that are communicated to the autonomous vehicle 102 and implemented at the autonomous vehicle 102 in real-time.

Also for example, the remote operating device 110 (e.g., a display and an input device or a touch screen) can generate an operator-generated path 134 (e.g., information representing a set of geographic locations or points designated by the remote operator 108 and/or information representing details or instructions associated with traversing the designated locations). The vehicle operation system 100 send the operator-generated path 134 to the autonomous vehicle 102, and the autonomous vehicle 102 can self-navigate or operate to traverse the operator-generated path 134.

For illustrative purposes, in some embodiments the vehicles are described as autonomous delivery trucks with SAE Level 4 capabilities. However, it is understood that the vehicles can include other type of vehicles (e.g., sedans, passenger vehicles, airplanes, drones, or ships), including other types of vehicles with automation capabilities less than a level corresponding to SAE Level 5.

Suitable System

Figure 2:
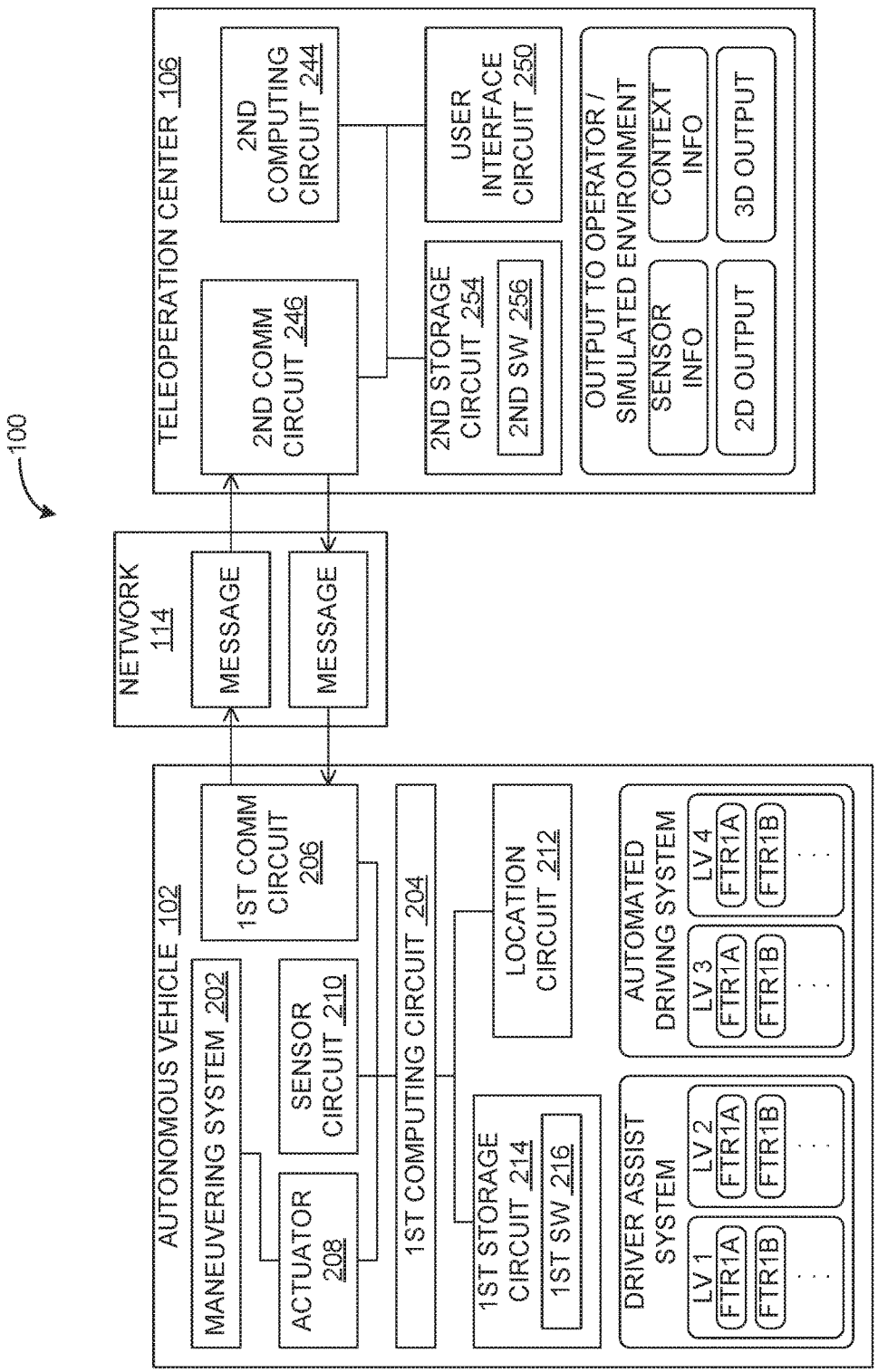
FIG. 2 is a block diagram illustrating a vehicle operation system according to some embodiments.

FIG. 2 is a block diagram illustrating the vehicle operation system 100. The vehicle operation system 100 includes several components and/or subsystems for implementing teleoperation of the autonomous vehicle 102. Aspects of the system may be practiced on various devices (e.g., including computing devices) operated by end-users, by the autonomous vehicle 102, the teleoperation center 106, by third parties (e.g., entities or services assisting or performing the dynamic driving task or the handover process), or a combination thereof.

The autonomous vehicle 102 can include a maneuvering system 202 (e.g., a system of vehicle components configured to maneuver or physically displace the vehicle) including a propulsion mechanism (e.g., an engine or a motor), a directional mechanism (e.g., steerable wheels, a rudder, a flap, movable propulsion mounts, etc.), a deceleration mechanism (e.g., brakes, an opposing engine or motor, a flap, etc.) and other related components. For automobiles, the maneuvering system 202 can include a drive train (e.g., an engine and a transmission) a steering system directing orientation of one or more wheels, a brake system, an external indicator system (e.g., lights corresponding to the brake or a lane-change operation), or a combination thereof.

The autonomous vehicle 102 can operate the vehicle maneuvering system 202 using a first computing circuit 204, a first communication circuit 206, a set of actuators 208, or a combination thereof. The actuators 208 can include a component for physically or mechanically moving or controlling one or more components of the vehicle maneuvering system 202. In some embodiments, the actuators 208 can be integral with the vehicle maneuvering system 202. In some embodiments the actuators 208 can be a separate subsystem that is connected to the vehicle maneuvering system 202.

The first computing circuit 204 (e.g., a circuit including one or more data processors, a special purpose computer, and/or an onboard server) can control the actuators 208 according to the teleoperation commands 130 of FIG. 1 in facilitating teleoperation of the vehicle by the remote operator 108 of FIG. 1. The teleoperation commands 130 can be received at the vehicle using the first communication circuit 206 (e.g., a circuit, such as including one or more antennas, a receiver/transmitter, a modulator/demodulator, a detector, a encoder/decoder, a modem, a gateway, a switch, etc., that enables the vehicle to communicate with other external devices).

The first computing circuit 204 can further control the actuators 208 according to the automated driving system and/or the driver assistance system autonomously operating the vehicle. The first computing circuit 204 can execute a first software 216 (e.g., computer-executable instructions) stored on a first storage circuit 214 (e.g., a circuit including memory, such as volatile memory, non-volatile memory, or a combination thereof) to provide the intelligence associated with the autonomous driving system and/or the driver assistance system. The first computing circuit 204 can execute the first software 216 to implement the automated driving system and/or the driver assistance system corresponding to one or more program modules.

In implementing the automated driving system and/or the driver assistance system, the first computing circuit 204 can autonomously generate or calculate the vehicle processing results 126 of FIG. 1 (e.g., self-generated paths, upcoming maneuvers, and/or the corresponding set points) and control the actuators 208 accordingly. The first computing circuit 204 can utilize the current maneuvering parameters 120 of FIG. 1 to generate or calculate the vehicle processing results 126.

For example, the first computing circuit 204 can utilize the sensor data 122 of FIG. 1 generated by a sensor circuit 210 (e.g., a circuit including components such as a radar, a LIDAR, an inertial motion unit (IMU), an encoder, an ultrasonic sensor, a proximity sensor, a camera, a lane sensor, or a self-reporting/detecting circuitry for errors and/or set points in components or subsystems, etc.) in autonomously operating the vehicle. Also for example, the first computing circuit 204 can similarly utilize the vehicle location 124 of FIG. 1 calculated by a location circuit 212 (e.g., a GPS positioning unit). In some embodiments, the location circuit 212 can be integral with the sensor circuit 210. In some embodiments, the first computing circuit 204 can calculate the vehicle location 124 using a dead-reckoning programming module, a WiFi-based locating module, the location circuit 212, or a combination thereof.

The first computing circuit 204 can further initiate the teleoperation process based on the current maneuvering parameters 120. In implementing the teleoperation process, the first communication circuit 206 can transmit and/or receive messages, such as request, the current maneuvering parameters 120, etc., to the teleoperation center 106.

The teleoperation center 106 can include a second communication circuit 246 (e.g., a circuit, such as including one or more antennas, a receiver/transmitter, a modulator/demodulator, a detector, a encoder/decoder, a modem, etc., that enables the vehicle to communicate with other external devices) that receives information from other devices, including the message from the autonomous vehicle 102. The second communication circuit 246 can further transmit to other devices, such as for transmitting the teleoperation commands 130 to the autonomous vehicle 102.

A second computing circuit 244 (e.g., a circuit including one or more data processors, a special purpose computer, and/or one or more of the servers 112) at the teleoperation center 106 can process the current maneuvering parameters 120 in implementing the teleoperation process. The second computing circuit 244 can interact with a user interface circuit 250 (e.g., a circuit configured to interact with a human user/operator). The user interface circuit 250 can include a variety of input/output devices or components, such as a display or other visual indicators, a speaker, a haptic feedback generator, a touchscreen, a keyboard, a mouse, a joystick, a button, a lever, a steering wheel, a pedal, or a combination thereof. For example, the user interface circuit 250 can include a set of devices used to communicate the current maneuvering parameters 120 and/or the surrounding environment 104 of FIG. 1 to the remote operator 108. Also for example, the user interface circuit 250 can include the remote operating device 110 of FIG. 1 for generating the teleoperation commands 130 according to inputs from the remote operator 108.

The second computing circuit 244 can execute a second software 256 (e.g., computer-executable instructions) stored on a second storage circuit 254 (e.g., a circuit including memory, such as volatile memory, non-volatile memory, or a combination thereof) to provide the intelligence associated with the teleoperation center 106 or the devices therein. The second computing circuit 244 can execute the second software 256 to implement the teleoperation process.

The various circuits, components, devices, and subsystems can be operably coupled to each other using a variety of mechanisms. For example, the circuits, components, devices, and subsystems can be electrically coupled to each other through wires, wireless connections, buses, etc. Also for example, the circuits, components, devices, and subsystems can be further coupled through communication protocols, operational flow or process, or a combination thereof.

For illustrative purposes the automated driving system and the driver assistance system is described as program modules implemented in the autonomous vehicle 102. However, it is understood that the systems can be implemented differently, such as using a dedicated device or a device separate from the vehicle (e.g., a navigating or maneuvering server, a route planning device, or the servers 112 at the teleoperation center 106).

Timing Associated with a Handover for a Vehicle Operation System

Figure 3:
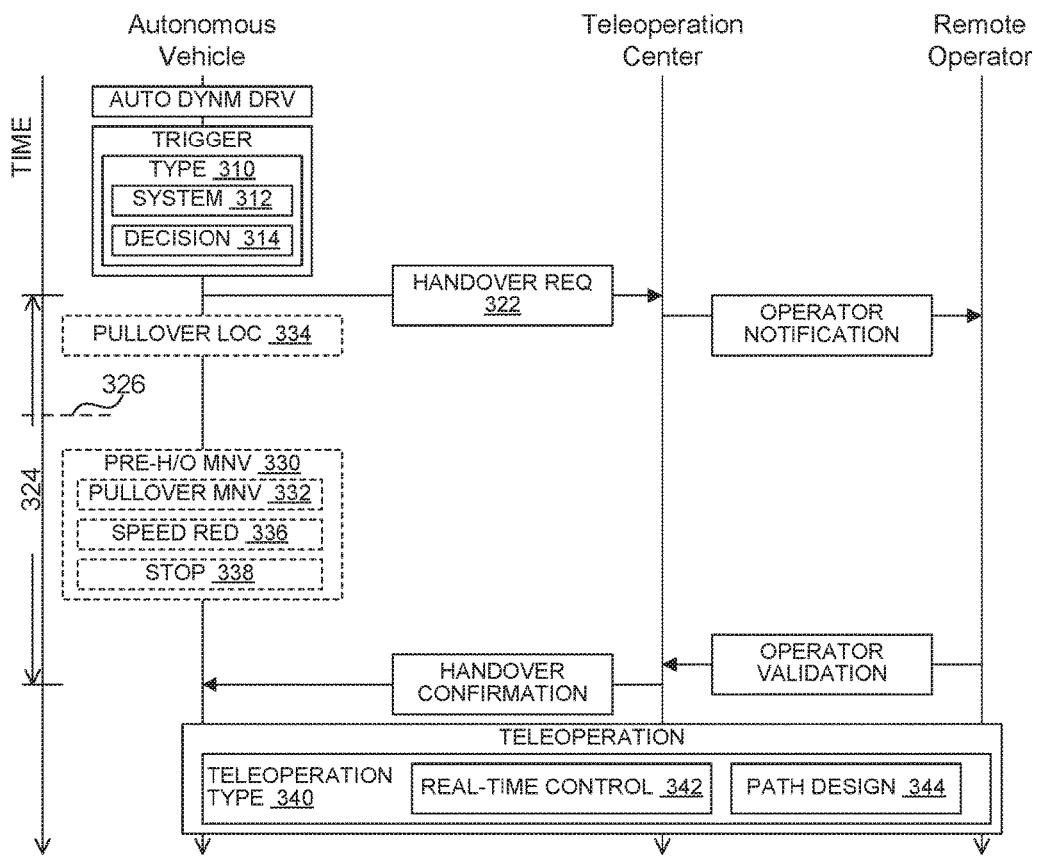
FIG. 3 is a timing diagram illustrating an example handover of control for the vehicle operation system according to some embodiments.

FIG. 3 is a timing diagram illustrating an example handover of control for the vehicle operation system 100 of FIG. 1 and FIG. 2 according to some embodiments. The vehicle operation system 100 can implement a handover to exchange operation control between the autonomous vehicle 102 of FIG. 1 and the teleoperation center 106 of FIG. 1. As illustrated in FIG. 3, the handover can include the operational control going from the autonomous vehicle 102 to the teleoperation center and transition from autonomous operation to teleoperation for the autonomous vehicle.

During autonomous operation (e.g., while performing autonomous dynamic driving tasks), the automated driving system can identify a teleoperation trigger corresponding to predetermined scenarios or conditions. The automated driving system can identify the teleoperation trigger based on the current maneuvering parameters 120 of FIG. 1. The automated driving system can further identify the teleoperation trigger according to a teleoperation trigger type 310, such as a system status trigger 312 or a decision ambiguity trigger 314, representing a cause leading to the teleoperation trigger.

For example, the automated driving system can determine the system status trigger 312 when the sensor data 122 of FIG. 1 (e.g., self-reported status from components or processes within the autonomous vehicle 102) indicate an issue or a malfunction at a systems level or a software/middleware level. The system status trigger 312 can correspond to system level conditions, such as sensor blindness (e.g., an object blocking the camera or a mechanical failure of the sensor circuit 210 of FIG. 2), overheating components (e.g., temperature sensor indicating overheating in the vehicle onboard servers), low tire pressure, etc. The system status trigger 312 can further correspond to software or middle level conditions, such as a discontinuity or erroneous timing of one or more signals, an erroneous calculation result, etc.

Also for example, the automated driving system can determine the decision ambiguity trigger 314 when the vehicle processing results 126 of FIG. 1 indicate an issue at a system intelligence level. The decision ambiguity trigger 314 can correspond to intelligence level conditions (e.g., regarding decisions made by the automated driving system according to its observation of the surrounding environment 104), such as when the automated driving system calculates a confidence level for a corresponding decision or vehicle-generated path that is below a confidence threshold, when the automated driving system produces oscillating decisions or vehicle-generated paths (e.g., outputting a number of different results, where the number exceeds an oscillation threshold, where the results were generated within a threshold duration, and/or where the results are associated with the same geographic location or area), etc.

The automated driving system can communicate a handover request 322 (e.g., a message from the autonomous vehicle to initiate the handover process) to the teleoperation center 106 based on identifying the trigger. When the teleoperation center 106 (e.g., using one or more of the servers 112 of FIG. 1) receives the handover request 322, one or more devices at the teleoperation center 106 (e.g., the user interface circuit 250 of FIG. 2) can communicate an operator notification (e.g., through a visual signal, an audible signal, a haptic stimulus, or a combination thereof) to the remote operator 108 of FIG. 1. The remote operator 108 can respond to the notification and signal to the vehicle operation system 100 that the operator is ready to operate the autonomous vehicle 102. Based on the operator's validation, the teleoperation center 106 can send a handover confirmation to the autonomous vehicle 102 and begin the teleoperation process.

The automated driving system can further perform other functions during the handover process, such as between communication of the handover request 322 and the handover confirmation. For example, the autonomous vehicle 102 can communicate the current maneuvering parameters 120 to the teleoperation center 106. Also, the automated driving system can perform a pre-handover maneuver 330 and physically move the autonomous vehicle 102 (e.g., by performing a pullover maneuver 332, a speed reduction 336, an immediate stop 338, or a combination thereof) in anticipation of the teleoperation.

The autonomous vehicle 102 can execute the pre-handover maneuver 330 autonomously based on the current maneuvering parameters 120 and the handover trigger. In some embodiments, the autonomous vehicle 102 can execute the immediate stop 338 regardless of the vehicle's location based on the system status trigger 312, an absence of a safe-to-travel determination (e.g., corresponding to an object located in the path of travel and within a threshold distance), specific types or instances of component or software errors or failures, or a combination thereof. In some embodiments, the autonomous vehicle 102 can execute the speed reduction 336 and slow the vehicle speed below a normal-operating speed (e.g., slower than the speed limit, the traffic flowrate, speed calculated without considering the handover trigger, or a combination thereof) based on the system status trigger 312 (e.g., a lower or decreasing tire pressure), the decision ambiguity trigger 314 (e.g., regarding a location and/or maneuver outside of a distance threshold), a safe-to-travel status, or a combination thereof.

In some embodiments, the autonomous vehicle 102 can execute the pullover maneuver 332 and bring the autonomous vehicle 102 to a stop at a pullover location 334 that is outside of a pathway (e.g., pullout locations or road shoulders). The autonomous vehicle 102 can calculate the pullover location 334 (e.g., according to the forward camera image, vehicle current location and the map information, or a combination thereof) and follow a set of predetermined maneuvers or objectives to pull the vehicle over at the pullover location 334. The autonomous vehicle 102 can calculate the pullover location 334 after determining the handover trigger and before the handover confirmation.

In some embodiments, the autonomous vehicle 102 can execute the pullover maneuver 332 and/or calculate the pullover location 334 based on a delay in receiving the handover confirmation. For example, the automated driving system can track an awaiting-reply timer 324 representing a duration between when the handover request 322 is sent to a current time. The automated driving system can execute the pullover maneuver 332 when the awaiting-reply timer 324 exceeds a reply timing threshold 326 before receiving the handover confirmation. In some embodiments, the reply timing threshold 326 can be a predetermined duration and/or travel distance. In some embodiments, the autonomous vehicle 102 can calculate or adjust the reply timing threshold 326 in real-time based on the current maneuvering parameters 120.

In some embodiments, the autonomous vehicle 102 can execute the pullover maneuver 332 independent of the handover confirmation, as part of a normal sequence of the handover process. Accordingly, the remote operator 108 can begin the teleoperation with the vehicle at rest and outside the flow of traffic.

In implementing the teleoperation, the vehicle operation system 100 can remotely operate the vehicle according to a teleoperation control type 340 (e.g., such as a real-time control mode 342 or a path designation mode 344). For the real-time control mode 342, the vehicle operation system 100 can receive real-time inputs from the remote operator 108 through the remote operating device 110 of FIG. 1 and generate the corresponding real-time control commands 132 of FIG. 1 to operate the vehicle. For the path designation mode 344, the vehicle operation system 100 can receive the operator-generated path 134 of FIG. 1 from the remote operator 108 and maneuver the vehicle according to the operator-generated path 134.

Concurrent Implementation of Autonomous Features and Teleoperation

Figure 4:
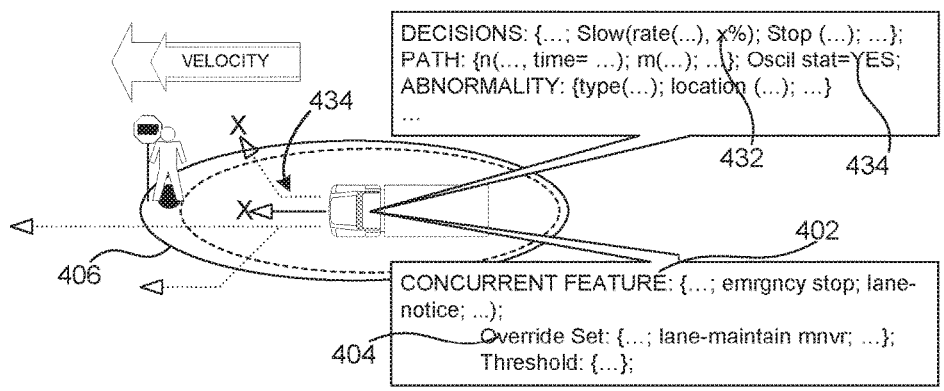
FIG. 4 is a diagram illustrating concurrent execution of an autonomous feature and teleoperation according to some embodiments.

FIG. 4 is a diagram illustrating concurrent execution of an autonomous feature and teleoperation according to some embodiments. The vehicle operation system 100 can generate a concurrent feature profile 402 for autonomous implementation (e.g., by the driving system at the autonomous vehicle 102 of FIG. 1) during the teleoperation. For example, the concurrent feature profile 402 can include features associated with lower-level SAE features (e.g., SAE level 1-3), such as automatic emergency braking, lane-veering notice and/or automatic steering to stay within a lane, etc.

The vehicle operation system 100 can also calculate an autonomous feature threshold 406 for implementing the concurrent feature profile 402. The autonomous feature threshold 406 (e.g., a threshold distance, a geographic area shape relative to the vehicle, such as front, rear, side, blind spots, etc., a size or a dimension adjustment factor, or a combination thereof) can represent an area around the autonomous vehicle 102 in which the current maneuvering parameters 120 and/or the vehicle processing results 126 are utilized to operate the vehicle. For example, the vehicle operation system 100 can override the teleoperation commands and/or autonomously implement features in the concurrent feature profile 402 based on the current maneuvering parameters 120 associated with the locations within the autonomous feature threshold 406.

The vehicle operation system 100 can calculate the autonomous feature threshold 406 according to the current maneuvering parameters 120. For example, the vehicle operation system 100 can calculate the autonomous feature threshold 406 based on a velocity vector (e.g., including the current vehicle speed a direction of movement), an acceleration vector, a traffic movement vector, or a combination thereof. Also for example, the vehicle operation system 100 can calculate or adjust the autonomous feature threshold 406 based the vehicle processing results 126, such as identification of a humanoid figure on the road or path of travel, a type or a location associated with the detected anomaly, etc.

Along with the concurrent feature profile 402, the vehicle operation system 100 can generate an override set 404 including autonomous features that are stopped or withheld during implementation of the teleoperation. For example, the override set 404 can include features (e.g., automatic maneuvers to maintain travel within a lane, path calculation, adaptive cruise control, etc.) that are ignored in light of the remote operator's control of the vehicle.

In some embodiments, the vehicle operation system 100 can generate the concurrent feature profile 402, the override set 404, or a combination thereof according to a predetermined list or set of features. In some embodiments, the vehicle operation system 100 can generate the concurrent feature profile 402, the override set 404, or a combination thereof to include the features corresponding to SAE Level 1, 2, 3, or a combination thereof. In some embodiments, the vehicle operation system 100 can generate the concurrent feature profile 402, the override set 404, or a combination thereof based on selecting features based on the current maneuvering parameters 120 matching one or more predetermined values thereof (e.g., as a representation of a condition or a scenario in the surrounding environment 104, the vehicle, or a combination thereof).

In some embodiments, the vehicle operation system 100 can process the concurrent feature profile 402, the override set 404, the autonomous feature threshold 406, or a combination thereof based on the vehicle processing results 126. The vehicle processing results 126 can include an identification of an upcoming abnormality (e.g., a condition or a situation that is outside of an expected or safe driving environment according to predetermined parameter values), a type and/or a location associated with the abnormality, or a combination thereof. For example, the vehicle operation system 100 can determine the abnormality type and location associated with a person on the road ahead of the vehicle. Accordingly, the vehicle operation system 100 can adjust the autonomous feature threshold 406 (e.g., increase or decrease the distance in front of vehicle, focus processing for emergency stop to areas directly in front of the vehicle, etc.), the concurrent feature profile 402 (e.g., emergency stop based on movement of object into an area in front of vehicle), the override set 404 (automatic swerving or stopping maneuvers associated with objects that are nearby but not directly in the path of travel), or a combination thereof.

In some embodiments, the vehicle operation system 100 can implement the handover and/or the teleoperation based on the vehicle processing results 126. The vehicle processing results 126 can include a maneuvering decision (e.g., a lane change, a speed reduction/increase, an execution of a turn, etc.), a device-generated path (e.g., a sequence of geographic locations targeted for traversal by the vehicle), or a combination thereof generated by the automated driving system. The vehicle processing results 126 can further calculate a confidence level 432 associated with each decision or path, such as based on a degree or a number of matches in the current parameters and a predetermined rule-set, model, scenario, etc. The vehicle operation system 100 can determine the teleoperation trigger type 310, determine the teleoperation control type 340, request the handover, or a combination thereof based on the confidence level 432 (e.g., when the confidence level is below a threshold level).

In some embodiments, the vehicle operation system 100 can track changes in the maneuvering decision, the device-generated path, or a combination thereof. For example, the vehicle operation system 100 can count a number of maneuvers or device-generated paths that are generated or adjusted within a time period, overlapping the same geographic location, or a combination thereof. When the number of changes exceed a predetermined threshold count, the vehicle operation system 100 can detect an oscillation in the processing results and determine the teleoperation trigger type 310, determine the teleoperation control type 340, implement the handover, or a combination thereof accordingly.

In some embodiments, the vehicle operation system 100 can implement multiple overlapping or concentric feature thresholds, each for different set of features. For example, the vehicle operation system 100 can implement the automatic emergency braking feature associated with conditions within a first threshold. The vehicle operation system 100 can implement the pull-over maneuver associated with conditions within a second threshold (e.g., according to the reply timing threshold 326 of FIG. 3) that is further from the vehicle than the first threshold.

Flows for a Vehicle Operation System

Figure 5:
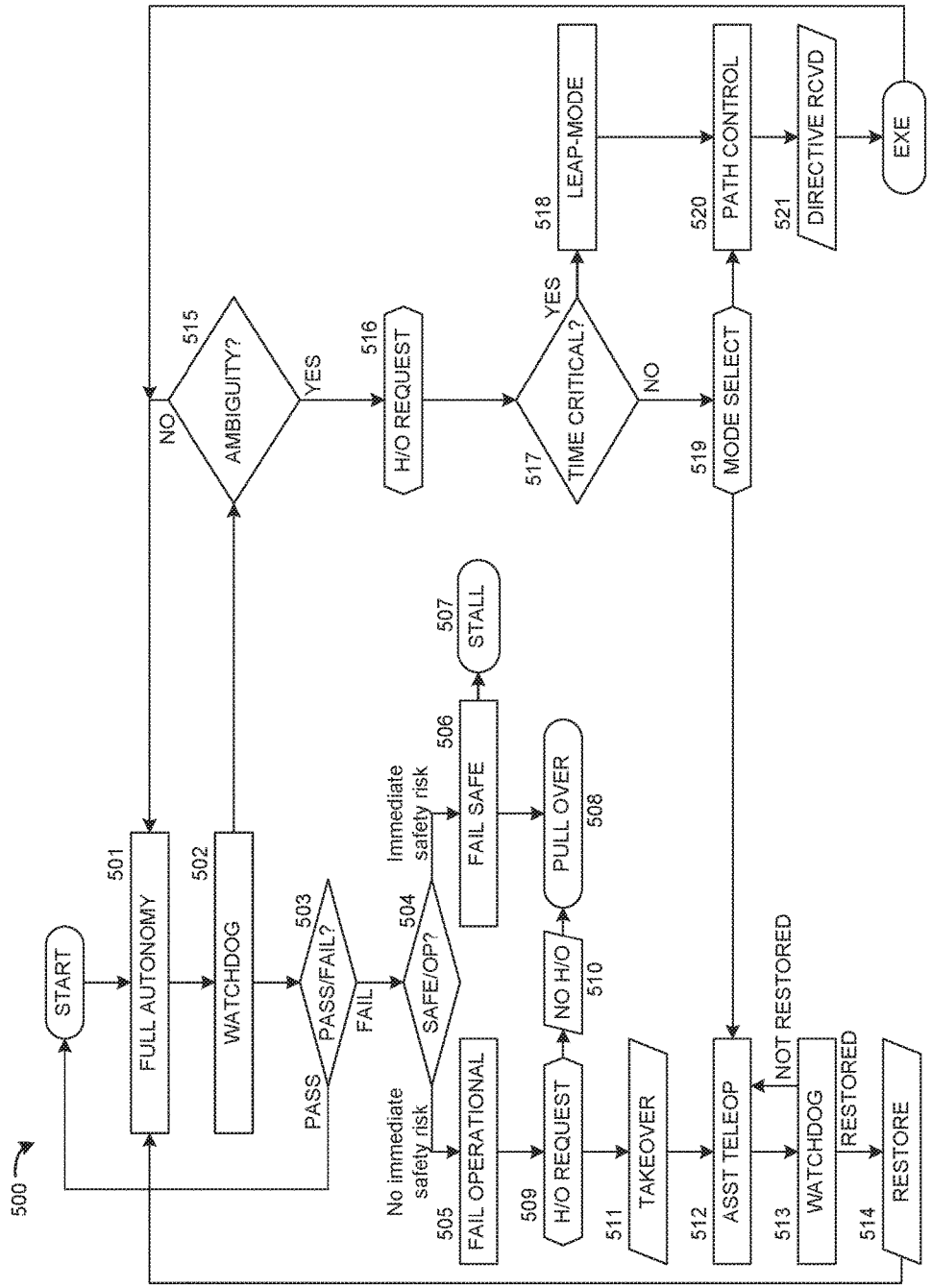
FIG. 5 is a flow diagram illustrating an example process for implementing teleoperation of the vehicle operation system according to some embodiments.

FIG. 5 is a flow diagram 500 illustrating a process 500 for teleoperating a vehicle with the vehicle operation system 100 of FIG. 1 according to some embodiments. The flow diagram 500 illustrates an example of a method of arbitrating control of vehicle between fully autonomous driving, machine assisted human control, and fail safe mechanisms according to some embodiments.

At block 501, the autonomous vehicle 102 of FIG. 1 can operate in autonomy mode (e.g., with the automated driving system controlling the vehicle). For example, the autonomous vehicle can operate at SAE Level 4 or SAE Level 5 capability.

The automated driving system can include a watch dog (e.g., illustrated in block 502) that encompasses software, hardware, methods, and approaches of monitoring vital signals (e.g., the current maneuvering parameters 120 of FIG. 1) from the vehicle. Signals sources can include, but are not limited to, autonomous driving related hardware such as the sensor circuit 210 of FIG. 2, drive-by-wire systems, the first computing circuit 204 of FIG. 2, the first storage circuit 214 of FIG. 2, vehicle networks, powertrain components (e.g., the vehicle maneuvering system 202 of FIG. 2), autonomous delivery related components such as package carriers, the first communication circuit 206 of FIG. 2; and/or autonomous driving software modules (e.g., automated driving system) performing localization, perception, path planning, trajectory planning, low level controls for brake, throttle, steering, turn-signals and transmission control.

The watchdog can be implemented as a decision engine to determine if operation is nominal for all autonomy and non-autonomy related operation. Based on autonomy distress, a pass/fail criteria is implemented at decision block 503 that can determine failure or low confidence of autonomy performance fidelity. For example, the pass/fail criteria can be based on conditions associated with the teleoperation trigger type 310 of FIG. 3, such as sensor blindness, poor confidence in planned paths due to ambiguous scenarios, etc.

A passing determination represents conditions adequate for fully autonomous operation of the vehicle, and the process returns to START. A failing determination, representing conditions inadequate for full-autonomous operation, can lead to a fail-safe or fail-operation arbitration at decision block 504 at which the nature, severity, and temporal characteristics of the distress signals are considered in selecting either a fail-safe at block 506 (e.g., representing conditions associated with more immediate safety risks, such as sensor obstruction or failure) or a fail-operational mode at block 505 (e.g., representing conditions associated with less immediate safety risks, such as a failure associated with a system or process that has a redundant counterpart or a slowly deflating tire). Accordingly the fail-safe or fail-operation arbitration at decision block 504 can include generating a safety status (e.g., a representation of a degree of risk associated with damage or loss according to predetermined scenarios and/or values corresponding to the current maneuvering parameters 120) based on the determinations at 503 corresponding to the teleoperation trigger type 310 (e.g., the system status trigger 312).

Determination of the fail-safe at block 506 can lead to one of two results: a stall at block 507 (e.g., reducing the vehicle velocity to 0 mph without trajectory modification, such as for executing the immediate stop 338 of FIG. 3) given allowance from the environment and other road agents, or a pull-over at block 508 (e.g., executing a pullover maneuver 332 of FIG. 3 to bring the vehicle to a stop at the pullover location 334 of FIG. 3) to safely extract the autonomous vehicle from active roads. The automated driving system can execute the immediate stop 338 based on recognizing certain scenarios or conditions or when the safety status is outside of an allowable threshold. Otherwise, the automated driving system can calculate the pullover location 334 (e.g., a geographic location that is ahead of the vehicle current location and outside of the flow of traffic) and execute the pullover maneuver 332 accordingly.

At block 509, the automated driving system can send the handover request 322 of FIG. 3 according to the fail-operational trigger at the block 505. The handover request 322 can be communicated over a wireless network to the teleoperation center 106 for initiating the teleoperation process (e.g., as illustrated in FIG. 3) and providing a human tele-operator an option to override. The teleoperation process can begin at block 511 based on receiving the handover confirmation at the vehicle. However, not responding to the request within the reply timing threshold 326 of FIG. 3 can directly lead to the block 508 with the vehicle autonomously executing the pullover maneuver 332.

In implementing teleoperation, the vehicle operation system 100 can enter an assisted teleoperation mode at block 512. The vehicle can communicate the current maneuvering parameters 120 to the remote operator 108 (e.g., through the devices at the teleoperation center 106). Based on the current maneuvering parameters 120, the remote operator 108 can use the remote operating device 110 to control the vehicle. The vehicle operation system 100 can communicate the corresponding teleoperation commands 130 of FIG. 1 to the vehicle for operating the vehicle.

For the teleoperation process, the vehicle operation system 100 can calculate the autonomous feature threshold 406 of FIG. 4 and generate the concurrent feature profile 402 of FIG. 4. The vehicle operation system 100 can calculate the autonomous feature threshold 406 based on the current maneuvering parameters 120 (e.g., the vehicle speed, upcoming abnormality location, upcoming abnormality location, recognition of predetermined conditions or situations in the surrounding environment 104, or a combination thereof). For example, the vehicle operation system 100 can calculate the autonomous feature threshold 406 as a distance ahead of the vehicle that increases as the vehicle speed increases. The vehicle operation system 100 can further increase the threshold based on conditions such as weather (e.g., rain or snow), component status (e.g., representing a deflated tire or a server temperature exceeding a threshold), upcoming abnormalities (e.g., such as increasing the threshold further when a human is in the travel path or road in comparison to a non-humanoid object), etc.

Similarly, the vehicle operation system 100 can generate the concurrent feature profile 402 for concurrent implementation during the teleoperation process. In some embodiments, the vehicle operation system 100 can generate the concurrent feature profile 402 based on selecting a predetermined group of features (e.g., SAE Level 1, 2, or 3). In some embodiments, the vehicle operation system 100 can generate the concurrent feature profile 402 based on the teleoperation commands 130. For example, the vehicle operation system 100 can generate the concurrent feature profile 402 to remove the automatic lane travel or correction feature and implement a lane notification feature when the teleoperation commands 130 indicate the remote operator 108 actively controlling the vehicle to cross the center lane markers.

The vehicle operation system 100 can implement the watchdog (e.g., driver assistance system) at block 513 concurrently during the teleoperation process. The watchdog can implement the features in the concurrent feature profile 402 for conditions recognized within the autonomous feature threshold 406. While the vehicle operation system 100 can allow the remote operator 108 to override the autonomous driving system, certain features can remain autonomous through the concurrent feature profile 402 and the autonomous feature threshold 406. Thus, the vehicle operation system 100 can account for sudden emergency situations, especially in light of the communication delay associated with the teleoperation. Whenever the autonomous feature is implemented, the vehicle operation system 100 can subsequently return the vehicle control to the remote human operator.

The vehicle operation system 100 can further implement the watchdog for a condition corresponding to termination of the teleoperation process. For example, the watchdog can look for the removal or disappearance of autonomy distress, the teleoperation command from the remote operator 108 for handing the control back to the autonomous driving system, a counter value (e.g., for timing the handover back to the autonomous system), or a combination thereof.

At block 514, the vehicle operation system 100 can restore autonomous driving mode based on the handover trigger. The autonomous vehicle 102 can reenter autonomy mode and resume fully-autonomous operation.

In addition to processing according to the system status trigger 312, the vehicle operation system 100 can initiate the teleoperation process even when the autonomous driving system is operating without any issues. For example, at decision block 515 the vehicle operation system 100 can check for the decision ambiguity trigger 314 of FIG. 3 as part of the handover evaluation process determining the teleoperation trigger (e.g., as part of the processes discussed above for the block 502 and/or 503). The vehicle operation system 100 can identify the decision ambiguity trigger 314 based on comparing the decision confidence level to the confidence threshold, tracking a number changes in the vehicle-generated path within a duration and comparing the number to the oscillation threshold, etc.

Without any ambiguity, the vehicle is allowed to remain in fully autonomous mode, such as for the block 501. Upon an ambiguity or decision-breakdown trigger (e.g., at block 516), the vehicle operation system 100 can communicate the handover request 322 to initiate the handover and the teleoperation processes.

At block 517, the vehicle operation system 100 can determine a time criticality associated with the surrounding environment 104. The vehicle operation system 100 can use the current maneuvering parameters 120 to determine an arrival time at a critical location (e.g., upcoming abnormality, a location or an area associated with the confidence level or the decision oscillation). In some embodiments, a route planning engine (not shown), such as for controlling and managing a fleet of delivery vehicles, can be consulted for time criticality of the delivery mission associated with the corresponding vehicle.

Upon determination of no criticality (e.g., based on comparing the arrival time to a threshold), the system can enter mode selection at block 519 for the use of a human operator. This can be due to the availability of time to decide between and/or implement a path control mode (e.g., allowing for the issuance of a custom locus of waypoints or pre-determined locus of waypoints per human discretion, such as the operator-generated path 134 of FIG. 1) at block 520 in addition to assisted teleoperation at the block 512. When the timing is determined to be critical, such as at block 518, the system can enter the path control mode without presenting an option for assisted autonomy.

In implementing the path control mode, the vehicle operation system 100 can receive the operator-generated path 134 from the operator through the remote operating device 110, and communicate the operator-generated path 134 to the autonomous driving system. The autonomous vehicle 102 can receive the operator-generated path 134 and/or the corresponding directives at block 521 and autonomously maneuver the vehicle accordingly to traverse the path designated by the operator. Upon traversing the operator-generated path 134, the vehicle operation system 100 can restore full autonomy, including path calculation.

In some embodiments, the vehicle operation system 100 can further implement one or more above-described operations for the blocks 503-510, or a combination thereof concurrently with the block 517. For example, the vehicle operation system 100 can execute the pullover maneuver 332, the speed reduction 336 of FIG. 3, or a combination thereof before the mode select of 519 or before the assisted teleoperation of 512. Also for example, the vehicle operation system 100 can execute the pullover maneuver 332 and/or revert to path control of 520 when the response delay exceeds the threshold.

The vehicle operation system 100 can implement the teleoperation and the concurrent features to provide increased safety and fidelity in operating the autonomous vehicle 102. Until SAE Level 5 vehicles can be developed and deployed with full confidence, the vehicle operation system 100 can leverage the teleoperation to safely manage conditions and situations that have not been fully developed for autonomous driving. Further, the concurrent features can ensure the safety and fidelity in light of communication delays and other potential issues for the teleoperation process.

The vehicle operation system 100 can further distinguish the teleoperation trigger types to provide improvements in operating safety during the handover process. By identifying the decision ambiguity, the vehicle operation system 100 can recognize conditions that have less immediate and/or less severe safety issue than hardware/software failures. The vehicle operation system 100 can use the distinctions to manage the handover and/or the teleoperation process, thereby giving higher priority and resources (e.g., in a limited resource environment) to control of more immediate and/or more severe in managing resources.

The vehicle operation system 100 can further provide improvements in safety and system usability based on implementing the pre-handover maneuver 330 before the teleoperation begins. By slowing the vehicle down and/or pulling over the vehicle at a safe location, the system can account for instances where the remote operator is not available to timely respond to the handover request. Further, by slowing the vehicle or by pulling over the vehicle, the system increases time for the remote operator to assess the situation and to correctly respond, thereby further reducing the safety risk, rather than being rushed to operate the vehicle upon implementing the teleoperation.

The vehicle operation system 100 can further provide improvements in optimization of system resources through the path control and the operator-generated path 134. For the path control mode, the vehicle operation system 100 can share the processing burdens with the autonomous vehicle, and use one-time communication of the operator-generated path 134 to guide and enhance the automatic driving system. Since the path control tasks can be performed without a real-time connection, the system can use less resources, schedule the task according to system resources/demands, or a combination thereof to improve the overall efficiency thereof.

In some embodiments, the vehicle operation system 100 can store the teleoperation commands 130 along with the corresponding trigger determinations, the corresponding maneuvering parameters, or a combination thereof for further use. For example, the vehicle operation system 100 can reuse the teleoperation commands 130 (e.g., as a template or for duplicated implementation) for similar conditions (e.g., for ongoing road repairs or for other fleet vehicles approaching the same location). Also for example, the vehicle operation system 100 can reuse the information to further improve the artificial intelligence of the automatic driving system (e.g., using the information as inputs for a machine learning mechanism associated with the artificial intelligence).

Figure 6:
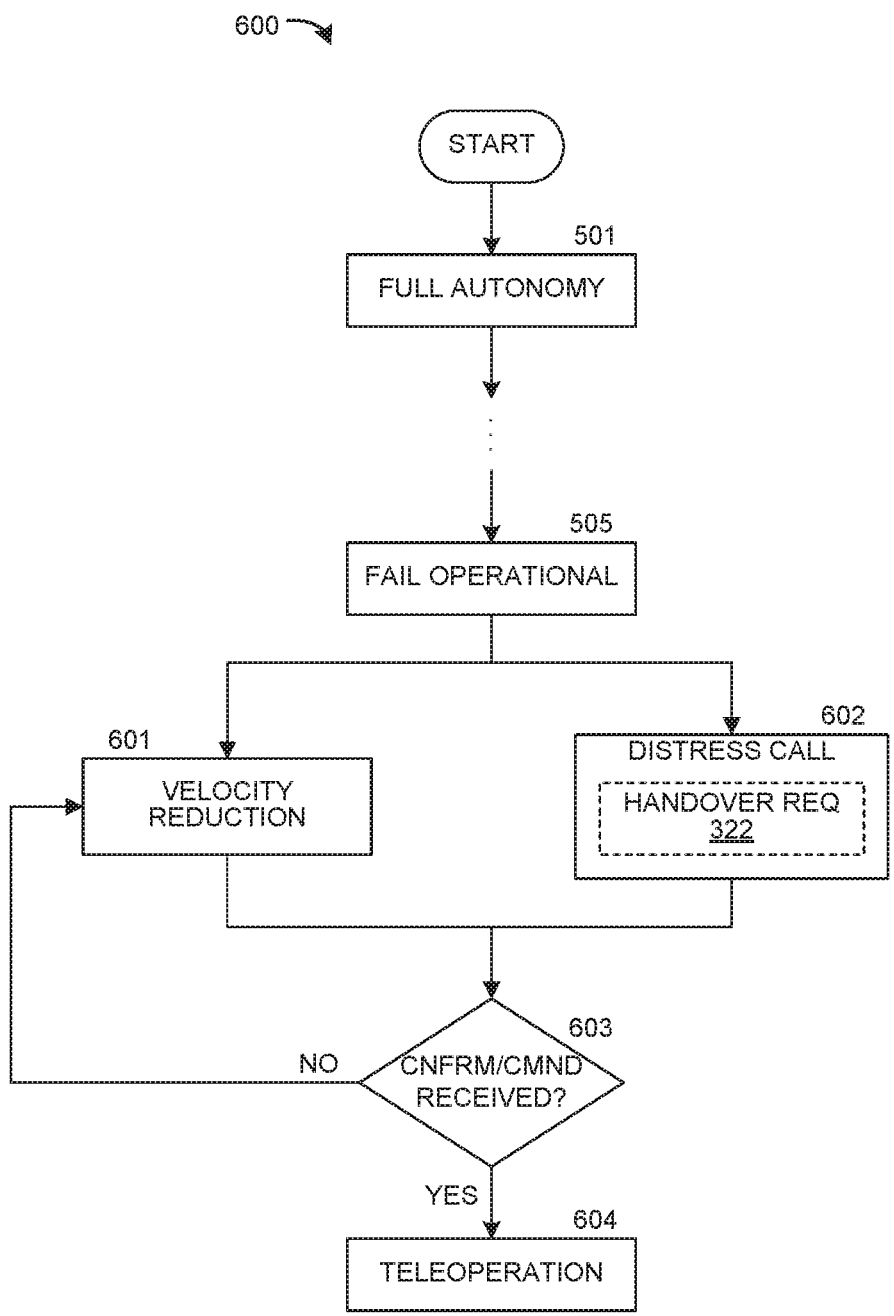
FIG. 6 is another flow diagram illustrating an example process for implementing a handover according to some embodiments.

FIG. 6 is a flow diagram illustrating an example process 600 for implementing the handover according to some embodiments. The flow diagram illustrates detailed examples for implementing the handover process between the handover request 322 and the handover confirmation.

When operating in full-autonomy, such as at block 501 as discussed above, the vehicle operation system 100 can implement the watch dog and check for pass/fail conditions and safe/operational conditions as discussed above for blocks 502-504 of FIG. 5. Based on detecting the fail-operational condition (e.g., based on identification of the system status trigger 312 and determination of safety status where the remote operator can take over with some delay), the vehicle operation system 100 can concurrently reduce the vehicle speed (e.g., autonomously perform the speed reduction 336) at block 601 and send a distress call (e.g., sending the handover request 322) to a remote operator at block 602.

At decision block 603, the vehicle operation system 100 can look for the handover confirmation. At block 604, the vehicle operation system 100 can implement the teleoperation when the handover confirmation is received by the autonomous driving system within an acceptable duration (e.g., before the reply timing threshold 326).

If the vehicle operation system 100 does not receive the handover confirmation within an acceptable duration, the vehicle can autonomously perform the speed reduction 336 and/or the pullover maneuver 332. In some embodiments, the vehicle operation system 100 can iteratively repeat (e.g., according to regular time intervals) the check at the block 603 and the velocity reduction at the block 601. The vehicle operation system 100 can reduce the speed by a predetermined amount at each iteration until the vehicle comes to a stop or perform the pullover maneuver 332 until a threshold condition is reached (e.g., an iteration limit or the reply timing threshold 326).

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method of operating a system for controlling a vehicle, the method comprising:
   detecting one or more current maneuvering parameters of the vehicle, wherein the current maneuvering parameters represent a status of the vehicle or a portion thereof, an environment surrounding the vehicle, or a combination thereof;
   generating a handover request based on the one or more current maneuvering parameters, wherein the handover request is for initiating teleoperation for operating the vehicle according to control inputs from an operator located remotely from the vehicle;

generating a concurrent feature profile based on the one or more current maneuvering parameters, wherein the concurrent feature profile represents one or more automated or semi-automated features to be implemented during teleoperation of the vehicle; and implementing one or more teleoperation commands while operating the vehicle according to the concurrent feature profile, wherein the one or more teleoperation commands represent commands from the remote operator for operating the vehicle.

2. The method of claim 1, wherein implementing the teleoperation commands while operating the vehicle according to the concurrent feature profile includes:

calculating an autonomous feature threshold based on the current maneuvering parameters, wherein the autonomous feature threshold identifies a geographic distance or area relative to the vehicle; and operating the vehicle according to the concurrent feature profile and independent of the teleoperation commands based on identifying an abnormality located within the autonomous feature threshold.

3. The method of claim 2, wherein calculating the autonomous feature threshold includes calculating the autonomous feature threshold based on a current speed of the vehicle, the current maneuvering parameters associated with generating the handover request, a teleoperation control type, or a combination thereof.

4. The method of claim 1, further comprising:

identifying a teleoperation trigger type for initiating operation of the vehicle according to a remote operator instead of the vehicle autonomously operating itself, wherein the teleoperation trigger type is identified based on the current maneuvering parameters; and selecting a teleoperation control type based on the teleoperation trigger type, wherein the teleoperation control type indicates details for teleoperating the vehicle.

5. The method of claim 4, wherein:

identifying the teleoperation trigger type includes identifying a system status trigger representing a condition associated with a vehicle maneuvering system, a computing circuit, a communication circuit, a sensor circuit, an actuator, a storage circuit, a software associated thereto, or a combination thereof within the vehicle; and selecting the teleoperation control type includes selecting a mode for operating the vehicle according to real-time control commands from the remote operator.

6. The method of claim 4, wherein:

identifying the teleoperation trigger type includes identifying a decision ambiguity trigger corresponding to a confidence level or an oscillation status of an automated maneuvering decision or a device-generated path; and selecting the teleoperation control type includes selecting a real-time control mode or a path designation mode, wherein the real-time control mode is for operating the vehicle according to real-time control commands from the remote operator, and the path designation mode is for operating the vehicle to traverse an operator-generated path.

7. The method of claim 4, further comprising:

generating a safety status based on identification of the teleoperation trigger type, wherein the safety status is generated according to the current maneuvering parameters;

determining a pre-handover maneuver based on the safety status, the teleoperation trigger type, the current maneuvering parameters, or a combination thereof, wherein the pre-handover maneuver is for maneuvering the vehicle in preparation for the teleoperation; and implementing the pre-handover maneuver before implementing the teleoperation commands.

8. The method of claim 7, wherein determining the pre-handover maneuver includes determining an emergency stop maneuver based on the safety status.

9. The method of claim 7, wherein determining the pre-handover maneuver includes determining a reduced speed.

10. The method of claim 9, further comprising:

communicating a handover request for notifying the remote operator to control the vehicle;

tracking an awaiting-reply timer based on communicating the handover request;

determining a reply timing threshold based on the reduced speed and an upcoming abnormality location;

calculating a pullover location for stopping the vehicle outside of traffic flow, wherein the pullover location is between a current vehicle location and the upcoming abnormality location; and wherein:

determining the pre-handover maneuver includes determining a pullover maneuver when the awaiting-reply timer exceeds the reply timing threshold, wherein the pullover maneuver is for maneuvering the vehicle to a stop at the pullover location.

11. The method of claim 7, wherein determining the pre-handover maneuver includes:

calculating a pullover location based on the safety status, the teleoperation trigger type, the current maneuvering parameters, or a combination thereof, wherein the pullover location is outside of traffic flow and between a current vehicle location and the upcoming abnormality location; and determining a pullover maneuver for the pre-handover maneuver independent of communicating a handover request for notifying the remote operator to control the vehicle.

12. The method of claim 1, further comprising:

communicating the current maneuvering parameters to the remote operator in real-time;

wherein implementing the teleoperation commands includes:

receiving real-time control commands representing operating inputs from the remote operator; and controlling the vehicle according to the real-time control commands generated by the remote operator.

13. The method of claim 1, further comprising:

communicating the current maneuvering parameters to the remote operator in real-time;

wherein implementing the teleoperation commands includes:

receiving operator-generated path representing a set of geographic locations for the vehicle to follow; and controlling the vehicle to traverse the operator-generated path.

14. The method of claim 1, further comprising:

after implementing the teleoperation commands, storing the teleoperation commands along with the current maneuvering parameters, analysis results thereof, resulting states, or a combination thereof corresponding to the teleoperation commands; and accessing the teleoperation commands based on matching the current maneuvering parameters, the analysis results thereof, the resulting states, or a combination thereof, wherein the teleoperation commands is accessed for maneuvering the vehicle at a later time in response to a condition associated with the previous implementation of the teleoperation commands.

15. A non-transitory computer-readable medium encoded with instructions that, when executed by a processor, perform a method of operating a system for controlling a vehicle, the method comprising:

detecting one or more current maneuvering parameters of the vehicle, wherein the current maneuvering parameters represent a status of the vehicle or a portion thereof, an environment surrounding the vehicle, or a combination thereof;

generating a handover request based on the one or more current maneuvering parameters, wherein the handover request is for initiating teleoperation for operating the vehicle according to control inputs from an operator located remotely from the vehicle;

generating a concurrent feature profile based on the one or more current maneuvering parameters, wherein the concurrent feature profile represents one or more automated or semi-automated features to be implemented during teleoperation of the vehicle; and implementing one or more teleoperation commands while operating the vehicle according to the concurrent feature profile, wherein the one or more teleoperation commands represent commands from the remote operator for operating the vehicle.

16. The non-transitory computer-readable medium of claim 15 including the method, wherein implementing the teleoperation commands while operating the vehicle according to the concurrent feature profile including:

calculating an autonomous feature threshold based on the current maneuvering parameters, wherein the autonomous feature threshold identifies a geographic distance or area relative to the vehicle; and operating the vehicle according to the concurrent feature profile and independent of the teleoperation commands based on identifying an abnormality located within the autonomous feature threshold.

17. The non-transitory computer-readable medium of claim 16 including the method, wherein calculating the autonomous feature threshold includes calculating the autonomous feature threshold based on a current speed of the vehicle, the current maneuvering parameters associated with generating the handover request, a teleoperation control type, or a combination thereof.

18. The non-transitory computer-readable medium of claim 15 including the method, the method further comprising:

identifying a teleoperation trigger type for initiating operation of the vehicle according to a remote operator instead of the vehicle autonomously operating itself, wherein the teleoperation trigger type is identified based on the current maneuvering parameters; and selecting a teleoperation control type based on the teleoperation trigger type, wherein the teleoperation control type indicates details for teleoperating the vehicle.

19. The non-transitory computer-readable medium of claim 18 including the method, wherein:

identifying the teleoperation trigger type including identifying a system status trigger or a decision ambiguity trigger, wherein:

the system trigger represents a condition associated with a component or software within the vehicle, and the decision ambiguity trigger corresponds to a confidence level or an oscillation status of an automated maneuvering decision or a device-generated path; and selecting the teleoperation control type including selecting a real-time control mode or a path designation mode based on the teleoperation trigger type, wherein:

the real-time mode is for operating the vehicle according to real-time control commands from the remote operator, and the path designation mode is for operating the vehicle to traverse an operator-generated path.

20. A vehicle controlling system, comprising:

an interface configured to receive one or more current maneuvering parameters associated with a vehicle, wherein the current maneuvering parameters represent a status of the vehicle or a portion thereof, an environment surrounding the vehicle, or a combination thereof;

one or more processors, operably coupled to the interface, configured to:

process a handover request corresponding to the one or more current maneuvering parameters, wherein the handover request is for initiating teleoperation for operating the vehicle according to control inputs from an operator located remotely from the vehicle;

generate a concurrent feature profile based on the one or more current maneuvering parameters, wherein the concurrent feature profile represents one or more automated features to be implemented during teleoperation of the vehicle; and implement one or more teleoperation commands while operating the vehicle according to the concurrent feature profile, wherein the one or more teleoperation commands represent commands from the remote operator for operating the vehicle.

\* \* \* \* \*